United States Patent [19]
Frick et al.

[11] Patent Number: 5,637,802
[45] Date of Patent: Jun. 10, 1997

[54] CAPACITIVE PRESSURE SENSOR FOR A PRESSURE TRANSMITTED WHERE ELECTRIC FIELD EMANATES SUBSTANTIALLY FROM BACK SIDES OF PLATES

[75] Inventors: Roger L. Frick, Hackensack; Bennett L. Louwagie, Plymouth; Adrian C. Toy, Eden Prairie, all of Minn.

[73] Assignee: Rosemount Inc., Eden Prairie, Minn.

[21] Appl. No.: 395,778

[22] Filed: Feb. 28, 1995

[51] Int. Cl.$^6$ .................................................. G01L 9/12
[52] U.S. Cl. ........................... 73/724; 73/718; 361/283.4
[58] Field of Search ...................... 361/283.4; 73/724, 73/718, 716, 717, 720; 324/661, 662, 688

[56] References Cited

U.S. PATENT DOCUMENTS

| | | | |
|---|---|---|---|
| 3,405,559 | 10/1968 | Moffatt | 73/398 |
| 3,743,552 | 7/1973 | Fa | 148/175 |
| 4,084,438 | 4/1978 | Lee et al. | 73/706 |
| 4,088,799 | 5/1978 | Kurtin | 427/38 |
| 4,196,632 | 4/1980 | Sikorra | 73/718 |
| 4,287,501 | 9/1981 | Tominaga et al. | 73/720 X |
| 4,301,492 | 11/1981 | Paquin et al. | 73/724 |
| 4,507,973 | 4/1985 | Barr et al | 73/724 |
| 4,542,436 | 9/1985 | Carusillo | 361/283 |
| 4,753,109 | 6/1988 | Zabler | 73/115 |
| 4,800,758 | 1/1989 | Knecht et al. | 73/727 |
| 4,972,717 | 11/1990 | Southworth et al. | 73/724 |
| 5,155,061 | 10/1992 | O'Connor et al. | 437/86 |
| 5,178,015 | 1/1993 | Loeppert et al. | 73/718 |
| 5,201,228 | 4/1993 | Kojima et al. | 73/724 |
| 5,227,068 | 7/1993 | Fukiura et al. | 73/724 |
| 5,287,746 | 2/1994 | Broden | 73/706 |
| 5,326,726 | 7/1994 | Tsang et al. | 437/228 |
| 5,332,469 | 7/1994 | Mastrangelo | 156/643 |
| 5,349,492 | 9/1994 | Kimura et al. | 361/283.4 |
| 5,381,300 | 1/1995 | Thomas et al. | 361/280 |
| 5,437,189 | 8/1995 | Brown et al. | 73/717 X |
| 5,471,884 | 12/1995 | Czarnocki et al. | 73/720 |

FOREIGN PATENT DOCUMENTS

| | | |
|---|---|---|
| 0 351 701 B1 | 6/1993 | European Pat. Off. . |
| 3 404 262 A1 | 9/1984 | Germany . |
| 47-82168 | 8/1972 | Japan . |
| 62-259475 | 11/1987 | Japan . |
| 63-285195 | 11/1988 | Japan . |
| 91-311556/43 | 12/1990 | Japan . |
| 5-107254 | 4/1993 | Japan . |
| 1 069 435 | 5/1967 | United Kingdom . |

OTHER PUBLICATIONS

L. Romana, P. Thevenard, B. Canut, G. Massouras and R. Brenier, *Nuclear Instruments and Methods in Physics Research B46*, "Phase Formation Study in $\alpha$-$Al_2O_3$ Implanted With Niobium Ions", published by Elsevier Science Publishers B.V. (North-Holland), pp. 94–97 (1990).

L. Shipu, F. Donghui, X. Ning, S. Zhenya and C. Xiaoming, *Processing of Advanced Materials*, "Surface electrical properties of Ni–implanted sapphire", published by Chapman & Hall, pp. 77–80 (1991).

(List continued on next page.)

*Primary Examiner*—Richard Chilcot
*Assistant Examiner*—Joseph L. Felber
*Attorney, Agent, or Firm*—Westman, Champlin & Kelly, P.A.

[57] ABSTRACT

A transmitter in a process control system transmits a pressure over a process control loop. The transmitter includes I/O circuitry, compensation circuitry and an absolute pressure sensor. The I/O circuitry transmits information over the process control loop. Compensation circuitry receives a pressure related signal and responsively controls the I/O circuitry to transmit pressure information on the loop. The absolute pressure sensor includes a cavity which deforms as the sensor deflects in response to an applied pressure. A sensor in the cavity provides the pressure related signal to the compensation circuitry in response to the deformation.

7 Claims, 16 Drawing Sheets

OTHER PUBLICATIONS

"Creep of Sensor's Elastic Elements: Metals versus Non-metals", K. Bethe, D. Baumgarten and J. Frank, *Nova Sensor—Silicon Sensors and Microstructure*, 1990, pp. 844–849.

"Silicon Sensors and Microstructure", J. Brysek, K. Petersen, J. Mallon, Jr., L. Christel, F. Pourahmadi, *Nova Sensor*, Jun. 1990, pp. 5.4–5.8, 8.21–8.23, 9.9–9.10, 9.13–9.15.

"Silicon Microcavities Fabricated with a New Technique", L. Tenerz and B. Hök, *Electronics Letters*, vol. 22, No. 11, May 22, 1986, pp. 615–616.

"A Balanced Resonant Pressure Sensor", E. Stemme and G. Stemme, *Sensors and Actuators*, A21–A23, 1990, pp. 336–341.

"Fabrication of an Implantable Capacitive Type Pressure Sensor", S. Shoji, T. Nisase, M. Esashi and T. Matsuo, *Transducers '87*, 1987.

"Silicon-to-silicon direct bonding method", M. Shimbo, K. Furukawa, K. Fukuda and K. Tanzawa, *J. Appl. Phys.*, vol. 60, No. 8, Oct. 15, 1986, pp. 2987–2989.

"Low–Temperature Preparation of Silicon/Silicon Interfaces by the Silicon–to–Silicon Direct Bonding Method", S. Bengtsson and O. Engström, *J. Electrochem. Soc.*, vol. 137, No. 7, Jul. 1990, pp. 2297–2303.

"Interface charge control of directly bonded silicon structures", S. Bengtsson and O. Engström, *J. Appl. Phys.*, vol. 66, No. 3, Aug. 1, 1989, pp. 1231–1239.

"Wafer bonding for silicon–on–insulator technologies", J.B. Lasky, *Appl. Phys Lett.*, vol. 48, No. 1, Jan. 1, 1986, pp. 78–80.

"Small sensitive pressure transducer for use at low temperatures", W. Griffioen and G. Frossati, *Rev. Sci. Instrum.*, vol. 56, No. 6, Jun. 1985, pp. 1236–1238.

"High–Temperature Healing of Lithographically Introduced Cracks in Sapphire", J. Rödel and A.M. Glaeser, *J. Am. Ceram. Soc.*, vol. 73, No. 3, Mar. 1990, pp. 592–601.

"Production of Controlled–Morphology Pore Arrays: Implications and Opportunities", J. Rödel and A.M. Glaeser, *J. Am. Ceram. Soc.*, vol. 70, No. 8, Aug. 1987, pp. C–172–C175.

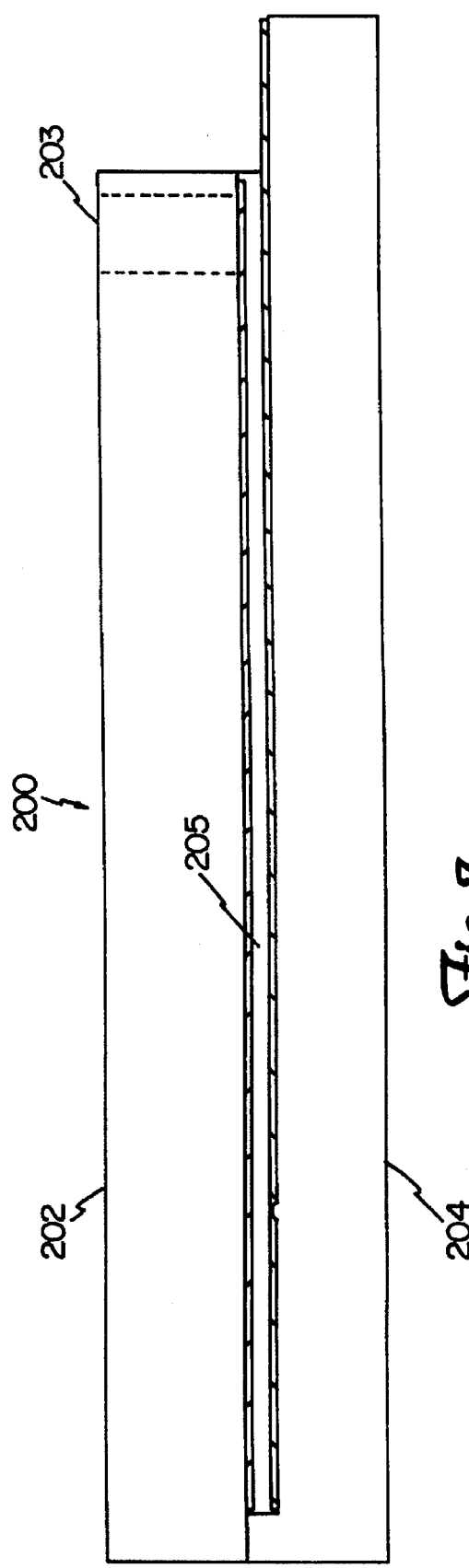
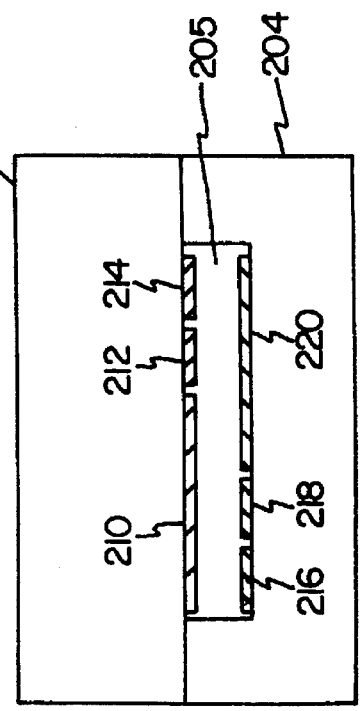
Fig. 7
Fig. 8

5,637,802

CAPACITIVE PRESSURE SENSOR FOR A PRESSURE TRANSMITTED WHERE ELECTRIC FIELD EMANATES SUBSTANTIALLY FROM BACK SIDES OF PLATES

BACKGROUND OF THE INVENTION

The present invention relates to the process control industry. In particular, the invention relates to a pressure sensor in a pressure transmitter.

Pressure transmitters in process applications measure pressure of a process and responsively communicate the information over a two-wire process application loop, for example a 4–20 mA current loop. Pressure sensors in transmitters typically comprise some type of a pressure responsive structure which has a deflectable diaphragm that moves in response to applied pressure. These structures can be used to measure both absolute and differential pressure. As used herein, a differential pressure sensor is a sensor which measures a relatively small pressure differential (such as that generated across an orifice in a flow tube or between two different heights in a fluid filled container) over a relatively wide absolute pressure range. In a typical prior art transmitter, to measure differential pressure, two different pressures are applied to opposing sides of the structure causing a relative deformation in the structure which is measured. Measurement of the deformation, for example, can be by measuring a change in electrical capacitance due to movement of capacitor plates carried on the structure or by change in resistance of a resistive strain gauge.

Highly accurate absolute pressure sensors have been desired. However, it has been difficult to obtain an absolute pressure sensor which can deliver an accurate output over a wide pressure range, from 0.4 psi to 4000 psi for example. It would also be desirable to measure differential pressure with two absolute pressure sensors because this is mechanically much simpler than it is to mechanically couple two pressures to a differential pressure sensor. Additionally, an over-pressure in a such a differential pressure sensor can damage the differential pressure sensor.

However, it has been difficult to obtain absolute pressure sensors with sufficient accuracy to allow differential pressures in the 0.4 psi to 40 psi range to be measured in a device which must withstand static or line pressure extremes of as much as 4000 psia. For example, 0.01% of 4 psid requires 0.00001% of 4000 psia ($10^{-7}$ or 0.1 ppm).

Typical known pressure sensors used in process applications have unit-to-unit variations in sensitivity to sensed pressure as well as unit-to-unit variations in undesired responses to extraneous parameters such as temperature. This can be a particular problem when the outputs of two absolute or gauge pressure sensors are combined to provide an output representing differential pressure or when the sensor is used over a large pressure range. Additionally, mechanical stress associated with mounting the sensor to the pressure transmitter results in relatively large errors in pressure measurement.

SUMMARY OF THE INVENTION

A pressure transmitter in a process control application for transmitting pressure on a process control loop includes an absolute pressure sensor. The absolute pressure sensor has a cavity therein in which cavity walls deform or are placed under stress as the walls respond to applied pressure. The pressure sensor includes a support structure which provides stress isolation. A sensor coupled to the cavity walls provides a pressure related output signal. In one embodiment, the sensor and support structure are integral with one another such that there are no joints between the sensor structure and the support structure. The material and dimensions of the pressure sensor are selected such that the pressure related signal is very accurate and may be used over a wide pressure range or in pairs as differential pressure sensors. In one embodiment, the pressure sensor comprises single crystal sapphire in an elongated shape and is adapted for immersion directly in process fluid.

BRIEF DESCRIPTION OF THE DRAWINGS

FIG. 7 is a cross-sectional view of a pressure sensor.

FIG. 8 is a cross-sectional view of the pressure sensor of FIG. 7.

DETAILED DESCRIPTION OF THE PREFERRED EMBODIMENTS

Figure 1:
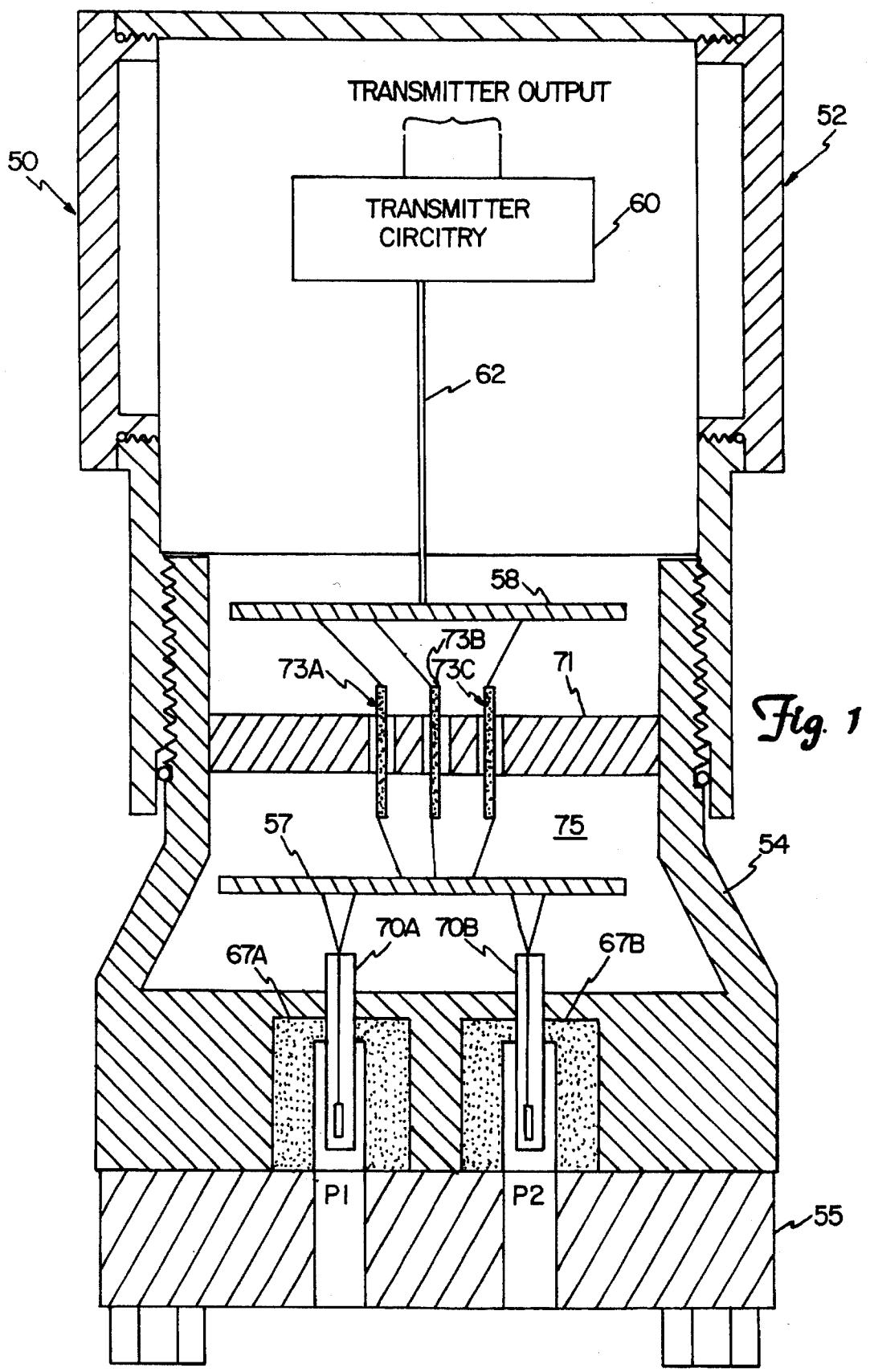
FIG. 1 is a cross-sectional view of a pressure transmitter.

FIG. 1 shows pressure transmitter 50 having transmitter body 52, sensor body 54 and flange 55. Sensor body 54 includes pressure sensors 70A and 70B which measure absolute pressure P1 and absolute pressure P2, respectively, of process fluid. Transmitter body 52 includes transmitter (I/O) circuitry 60 which sends information related to pressures P1 and P2 over a two-wire process control loop, such as a 4–20 mA current loop. Circuit board 57 couples sensor circuit board 58 to sensors 70A and 70B and receives electrical signals related to pressures P1 and P2. Circuitry on sensor circuit board 58 digitizes and processes these signals, and communicates pressure information to transmitter circuitry 60 using data bus 62. Inserts 67A and 67B carry sensors 70A and 70B. A process barrier 71 forms cavity 75 and prevents pressures P1 and P2 from escaping sensor body 54 should insert 67A or 67B fail. Cavity 75 may be a vacuum or filled with an inert gas. Feed-throughs 73A, 73B and 73C provide electrical pathways across barrier 71 between circuit boards 57 and 58.

Figure 2:
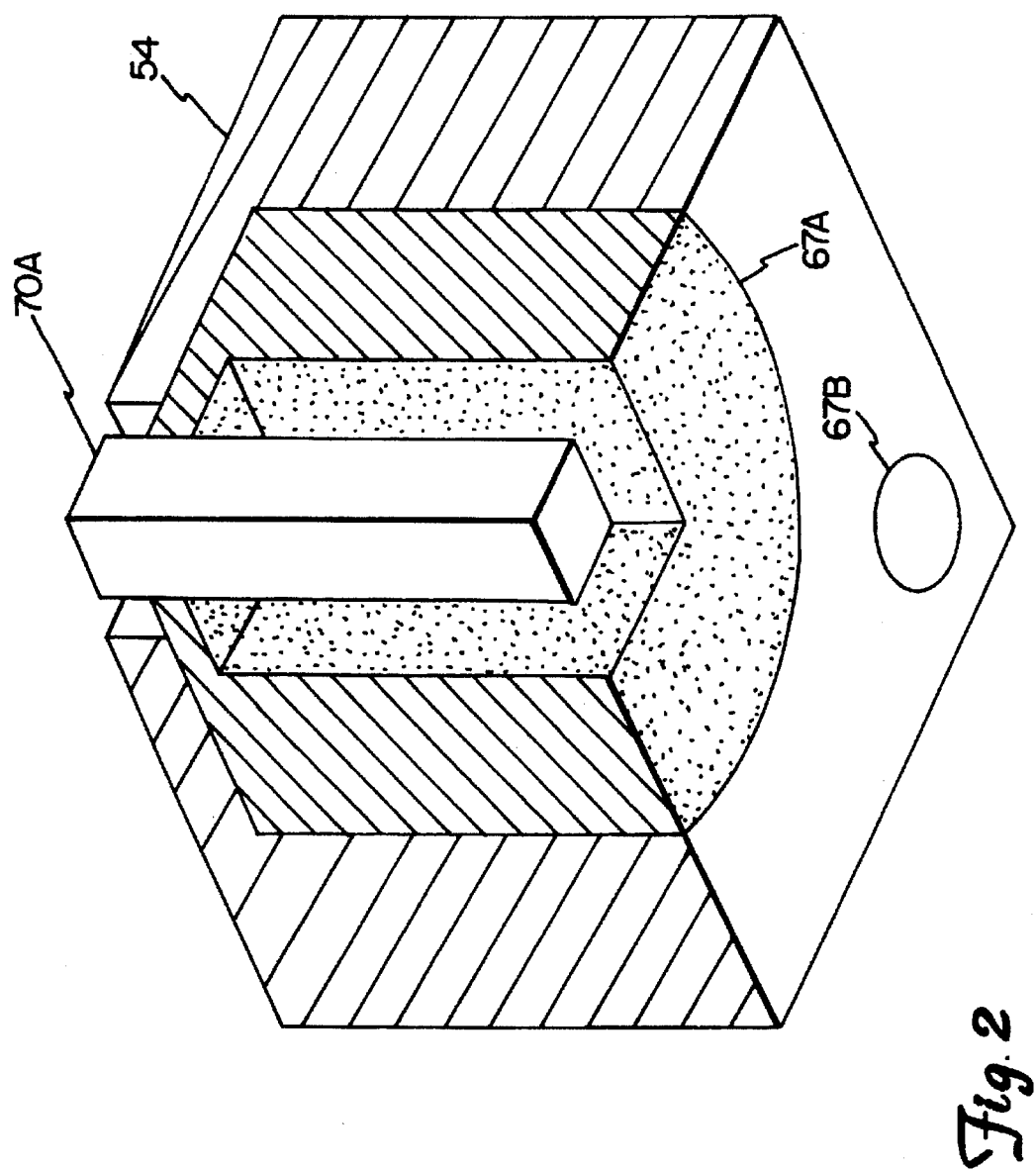
FIG. 2 is a cut-away perspective view of an insert which carries a pressure sensor.

FIG. 2 is a cut-away perspective view of insert 67A which carries sensor 70A. In one embodiment, insert 67A comprises alumina. Additionally, sensor 70A should be small relative to housing 54 and positioned relatively close to sensor 70B to reduce thermal variations and thereby improve accuracy. This is achieved because the thermal time constant of the sensor is significantly less than the thermal time constant of the housing to minimize temperature gradients within the sensing element.

Figure 3:
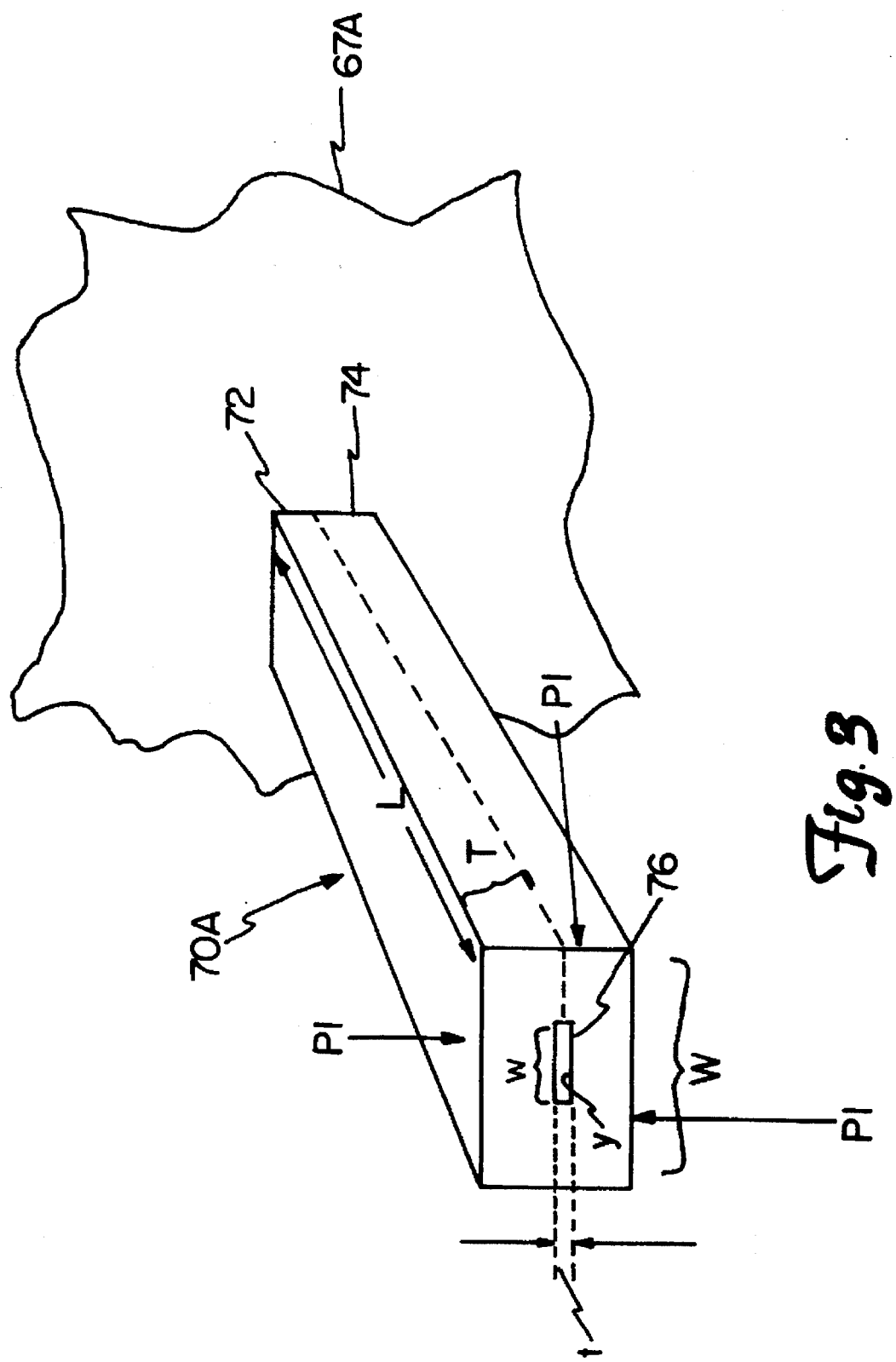
FIG. 3 is a cross-sectional perspective view of a pressure sensor.

FIG. 3 shows sensor 70A in accordance with one embodiment. Sensor 70A includes upper substrate 72 and lower substrate 74 which form cavity 76 therebetween. FIG. 3 shows overall length L, thickness T, width W, minimum cavity width w of the deflecting structure of the sensing cavity and central deflection y due to applied pressure P.

Typical prior art sensors have a ratio of maximum to minimum pressure range which can be accurately sensed of about 100:1. This is primarily limited by non-repeatable errors in the structure and noise. Further, prior art sensors are typically limited by the use of materials with imperfect elasticity, inadequate stress isolation and poor signal-to-noise ratio of the sensing element. For example, metal based pressure sensors have problems with hysteresis, material creep and relaxation. Ceramic based sensors are formed of a matrix of crystals typically bonded with silicon glass and also exhibit these problems. Glass-based sensors are subject to instability due to phase changes and viscosity of the glass. It has been recognized that single crystal materials have superior elastic properties and that sensors based on such materials can have improved accuracy. Single crystal diaphragm sensors have also been used, however they have typically been placed under high tensile stress due to internal pressurization. Additionally, this type of sensor typically includes glass or metal structural elements and uses a low strength bonding material such as glass frit, solder or epoxy. Further, this type of sensor has typically had inadequate stress isolation.

Additionally, typical prior art sensors have used an oil fill, such as silicon oil, for use with over-pressure protection mechanisms. The oil fill is also used when coupling a corrosion resistant isolation diaphragm to the pressure sensor. These sensors are subject to failure due to loss of fill fluid. Typical prior art isolating diaphragms have been form formed in metal and are used to keep particles and corrosive materials away from the pressure sensor. These diaphragms must be thin in order to minimize errors, however this makes the diaphragm particularly fragile and limits life of the diaphragm. Further, different diaphragm materials are required for different applications and there is no metal which can be used universally.

The present disclosure sets forth a pressure sensing structure formed of a single crystal material. Joints in the material are formed using fusion bonding such that they are substantially free of foreign materials which could lead to inaccuracies. The structure may be surrounded by process fluid which applies pressure to the structure. This is possible because the structure is formed of a corrosion resistant material. The brittle material is deformed by compression which provides a higher ratio of working stress-to-error stress and therefore a higher signal-to-noise ratio. This results because brittle materials are stronger in compression than in tension. This configuration causes the sensor to be less sensitive to corrosion of the outer surface because the output is less dependent on the cube of thickness and more closely linearly related to thickness. Placement of the structure in the process fluid improves reliability because the isolation diaphragms and oil fill are eliminated. An elongated shaft provides stress isolation and is formed of the same single crystal material to help reduce errors. Electrical leads are provided through the elongated shaft and isolated from process fluid. A path through the shaft can also be used to apply a reference pressure. In one embodiment, corrosion resistant material such as sapphire is used and an internal sensor is used which allows the oil fill and isolating diaphragms to be eliminated. In one embodiment, matched sensors are used as dual sensors to measure differential pressure, which helps reduce errors common to the two sensors. Capacitance sensing is desirable because it provides a stable, low noise signal. Capacitors have no inherent thermal noise and they have a high gauge factor with a correspondingly high output which minimizes the noise contribution of electronic detection circuitry. They also have excellent zero stability and very low zero temperature coefficients. These factors make it practical to detect the very low pressure changes in a high pressure sensor that are encountered in a differential pressure transmitter based on two independent sensing elements. Improved pressure resolution is achieved by use of electronic circuitry.

It is well known that the deflection y due to bending in a diaphragm is proportional to $$\left(\frac{w^3}{T^2}\right)$$

where w is the effective minimum width of the diaphragm and T is its thickness $$\left(y \propto \frac{w^2}{T^2}\right).$$

The sensor output is therefore highly dependent on dimensional variations.

It is known that deflection due to shear in a diaphragm proportional to $w^2/T$.

$$\left(y \propto \frac{w^2}{T}\right)$$

This reduces the variation in output versus sensor dimensions but this variation can be further reduced by relying on "bulk" deflection as defined below.

The deflection y of cavity 76 will depend on the effects of bending deflection, shear deflection and "bulk" deflection. Assuming that W/w equals a constant which is greater than 2, this can be expressed as follows:

$$\frac{y}{w} \cong K_1\frac{P}{E} + K_2\frac{P}{G}\left(\frac{w}{T}\right) + K_3\frac{P}{E}\left(\frac{w}{T}\right)^3 \quad \text{Equation 1}$$

where:

$K_1$="bulk" deflection constant for material;
$K_2$=shear deflection constant for material;
$K_3$=bending deflection constant for material;
W=sensor width;
P=external pressure;

y=central deflection of cavity 76 due to applied pressure P;

w=width of cavity 76;

T=thickness at slot 76 of sensor 70 (for a square cross section, T=W/2);

t=depth of cavity 76;

L=sensor length which is much greater than sensor width W and sensor thickness T;

E=Young's modulus; and

G=shear modulus.

Equation 1 illustrates that shear and bending deflection on cavity 76 are dependent on cavity width w and sensor thickness T.

The term "bulk" deflection as used herein describes the $K_1P/E$ component of Equation 1, where y is directly proportional to width w of cavity 76. (y∝w) Therefore, bulk deflection is highly accurate and desirable in determining pressure and is substantially independent of variations in thickness T such as those which occur with corrosion. One aspect of the present invention includes providing a pressure sensor having dimensions such that bulk mode deflection component of total deflection of the sensor is increased.

Figure 4:
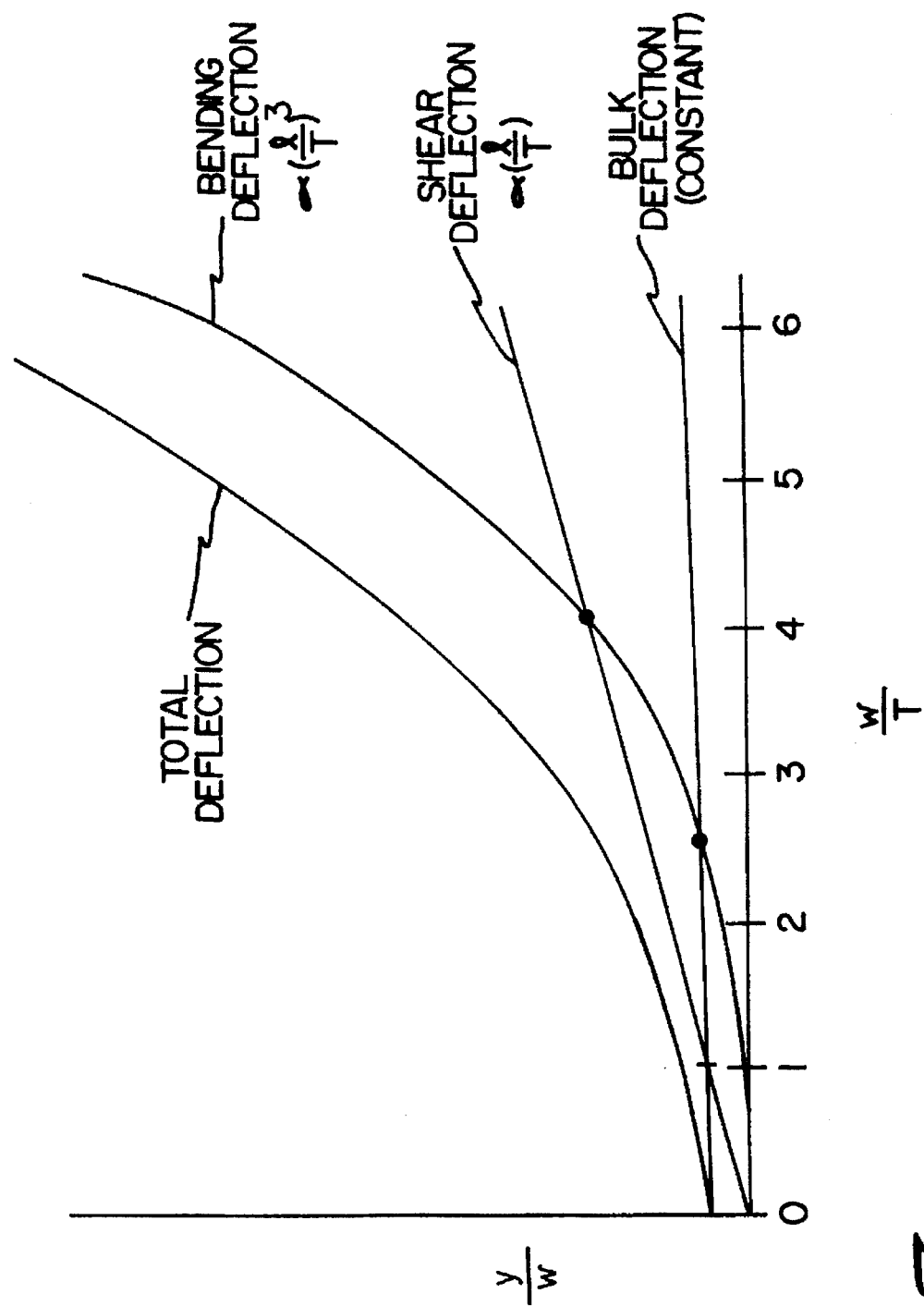
FIG. 4 is a graph which illustrates operation of the present invention.

FIG. 4 is a graph of Equation 1 which shows total deflection and its individual components: bulk deflection, shear deflection and bending deflection. When w/T is between 1 and 4, shear deflection predominates total deflection. As w/T gets smaller, the contribution of shear deflection relative to bulk deflection gets smaller. For w/T less than 1.0, bulk deflection is the predominant factor contributing to total deflection of sensor 70A due to applied pressure. Thus, one aspect of the invention includes pressure sensors having a ratio of w (cavity width) divided by T (thickness from an outer surface to an inner surface) of less than or equal to about 1.0. For shear deflection to exceed bending deflection w/T should be less than 4.0. In one embodiment, the ratio of w/T is: $0.05 \leq w/T \leq 1.0$. The minimum w/T value is determined by how small w can be practically made and inaccuracies due to thermal gradients as T is made large.

It is desirable to minimize tensile stresses in sensors made of brittle materials because this reduces the possibility of failure due to cracking of the sensor. One aspect of the invention includes surrounding the sensor with the measured pressure and suitably dimensioning the sensor such that the hydrostatic compressive stress can be made to exceed the tensile bending stresses. Since the stresses are generally additive, the entire structure can be kept in compression. This occurs when w/T is less than about 2.3.

Figure 4A:
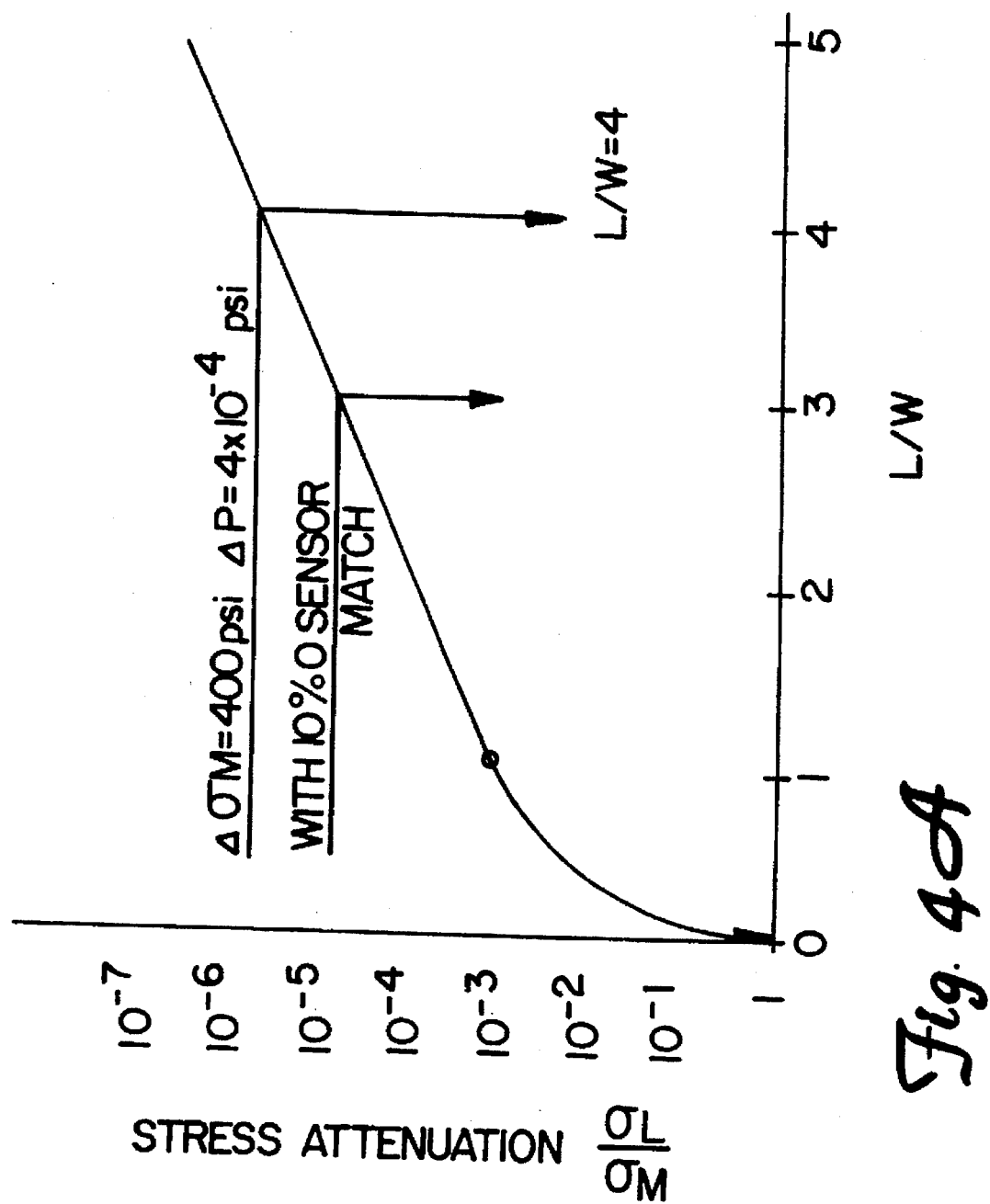
FIG. 4A is a graph of stress attenuation versus L/W for a pressure sensor.

Stress isolation of sensor 70A is also achieved. Stress due to mounting sensor 70A to housing 54 causes a force to be exerted on the sensor (in addition to the force due to applied pressure) and introduces an error into pressure measurements. The elongated structure reduces the effects of mounting stress to provide accurate measurement of differential pressures and a wide operating span. Generally, mounting stress attenuates distal to the mount as sensor length L increases. Any mounting stress errors must be sufficiently attenuated over length L to achieve the desired pressure error. FIG. 4A is a graph which shows a relationship between stress attenuation and L/W for the sensor of FIG. 3. The vertical axis of FIG. 4A shows the ratio of the stress at the mounting point ($\sigma_{MOUNT}$) to the measured stress due to the mounting stress ($\sigma_{MEASURED}$). A change in the mounting stress ($\Delta\sigma_{MOUNT}$) causes an error in the pressure measurement due to the change in mounting stress at the pressure sensor ($\Delta\sigma_{MEASURED}$). In one embodiment, a 0.01% accuracy is required such that when measuring a pressure of 4 psi the error due to mounting stress must be less than $4\times10^{-4}$ psi. A typical $\Delta\sigma_{MOUNT}$ value is 400 psi such that the attenuation of the mounting stress must be $4\times10^{-4}$ psi/by 400 psi=$10^{-6}$. As shown in FIG. 4A, this occurs at approximately L/W of 4. In an embodiment in which two sensors are used for differential pressure measurement and they are matched within 10% accuracy, $\sigma_{MEASURED}/\sigma_{MOUNT}$ is reduced by a factor 10 such that L/W is approximately 3. In one embodiment, L/W is between 3 and 5.

Figure 5:
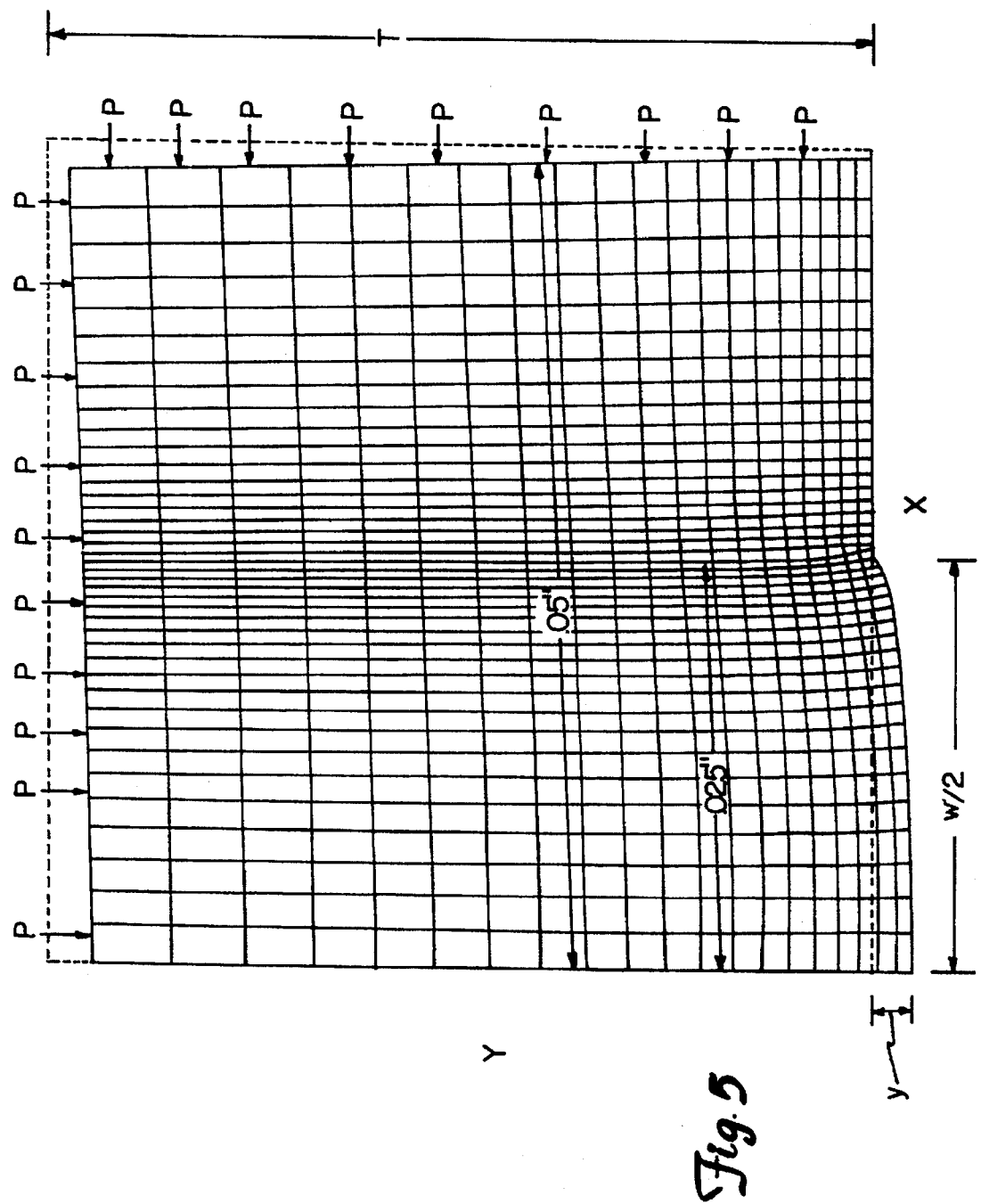
FIG. 5 is a displacement plot of one-quarter of a pressure sensor where l/T equals 1.0.

FIG. 5 is a cross-sectional view showing a displacement plot for sensor 70A. FIG. 5 shows one-quarter of the cross section of sensor 70A. In FIG. 5, sensor thickness T is approximately equal to cavity width w. An applied pressure P of 4500 psi displaces sensor 70A. In FIG. 5, about half the deflection is due to shear tension and about half is due to "bulk" deflection. This is shown in FIG. 4 where shear and bulk deflection meet. If sensor 70 were entirely in bulk mode compression, sensor 70 would retain its rectangular shape as pressure was applied. The shape distortion is due primarily to shear deflection.

Figure 6:
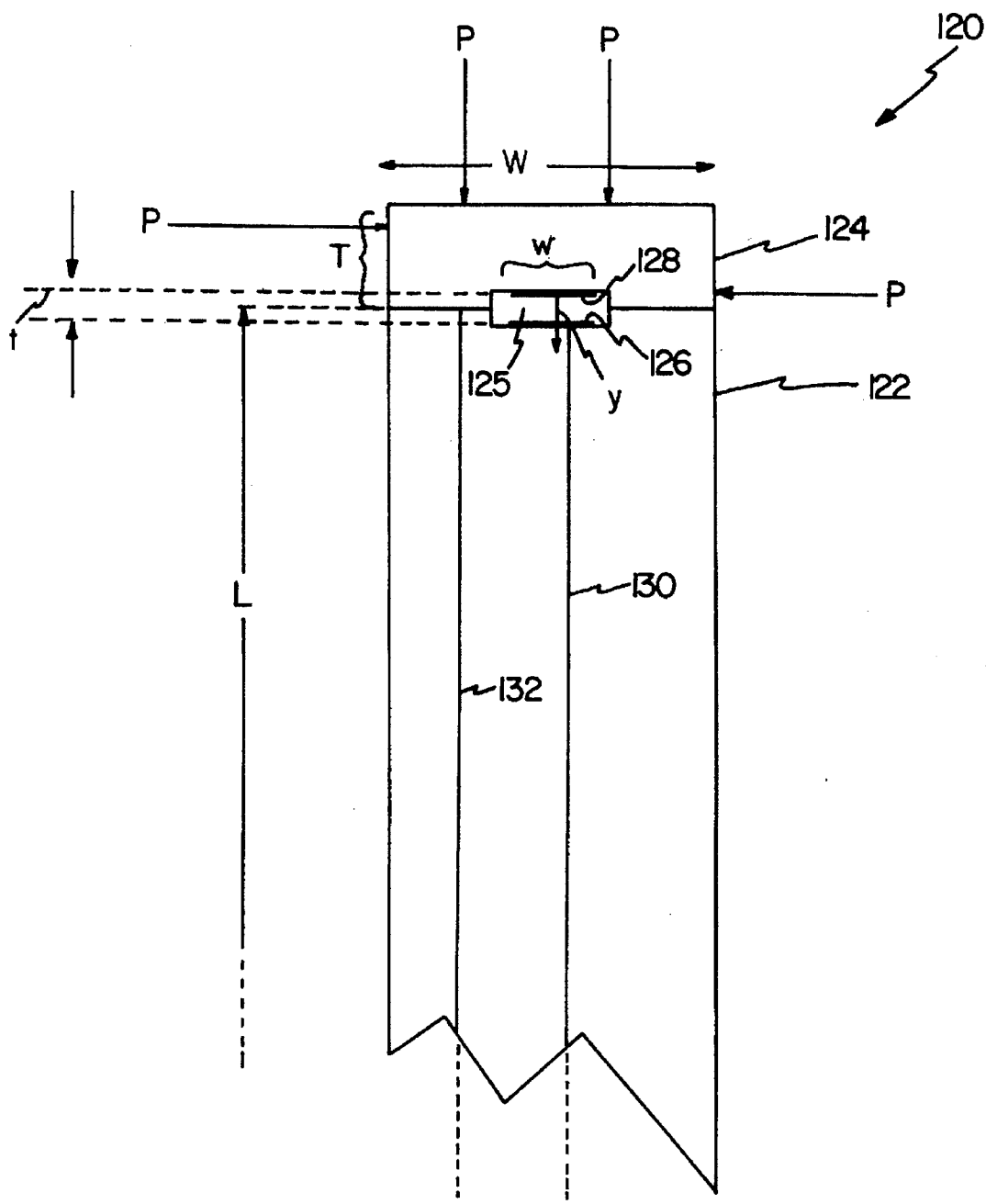
FIG. 6 is a cross sectional view of another embodiment of the pressure sensor.

FIG. 6 is a cross sectional view of sensor 120 including elongated portion 122 and end portion 124 which form cavity 125 having width w. In one embodiment, cavity 125 is square. Dimensions T, W and L are also shown in FIG. 6. End portion 124 carries capacitive plate 128 which forms a capacitor with plate 126 carried on portion 122. Conductors 130 and 132 connect to plate 126 and 128, respectively. Pressure P causes cavity 125 to deform, thereby changing the capacitance between plates 126 and 128.

Figure 9:
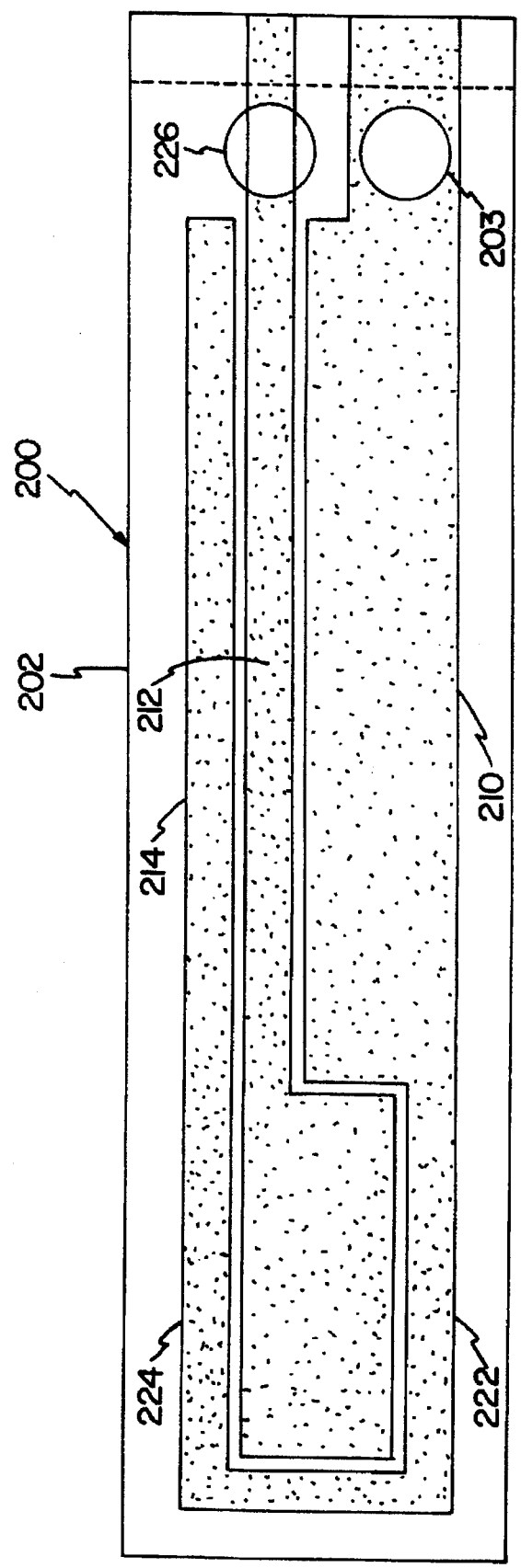
FIG. 9 is a top plan view of a top substrate of the pressure sensor of FIG. 7.

FIG. 7 is a cross-sectional view of pressure sensor 200. Pressure sensor 200 includes top substrate 202 and lower substrate 204. Via hole 203 extends through substrate 202 for coupling to electrical conductors in cavity 205. FIG. 8 shows top guard conductor 210, top capacitor conductor 212, top guard conductor 214, bottom guard conductor 216, bottom capacitor conductor 218 and bottom guard conductor 220. FIG. 9 is a top plan view of substrate 202 in which electrical conductors on the under side of substrate 202 are visible therethrough. FIG. 9 shows capacitor plate 222 connected to conductor 212 and surrounded by guard 224 which connects to conductors 214 and 210. FIG. 9 also shows vias 203 and 226 which extend through substrate 202 to conductors 210 and 212, respectively.

Figure 10:
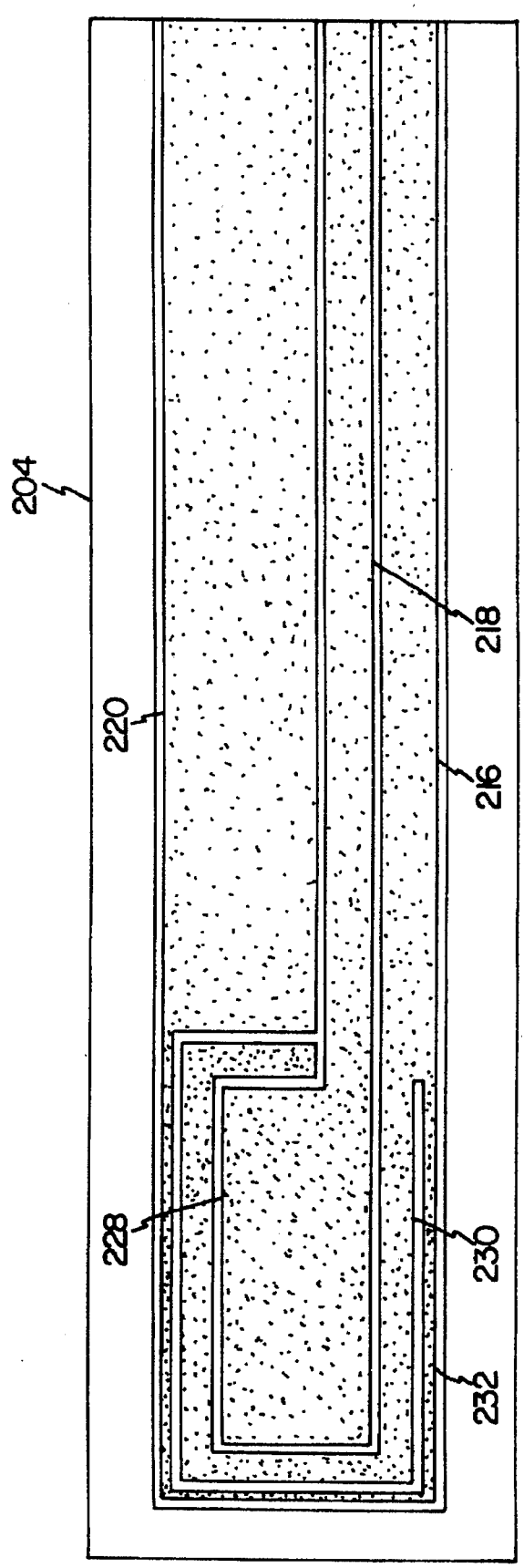
FIG. 10 is a top plan view of a bottom substrate of the pressure sensor of FIG. 7.

FIG. 10 is a top plan view of bottom substrate 204 in which electrical conductors carried on the underside of substrate 204 are visible therethrough. In the example, substrate 204 is sapphire. FIG. 10 shows capacitor plate 228 which capacitively interacts with capacitor plate 222. Plate 228 is surrounded by electrical guard 230 and temperature sensor 232. Guard 230 shields plate 228 from stray capacitance and temperature probe 232 changes resistance based upon temperature. This provides temperature measurement of sensor 200, and allows compensation of pressure measurements based upon temperature for increased accuracy. Bonding is preferably fusion bonding, also known as direct fusion bonding, or wafer bonding in which flat, polished surfaces are mated and are bonded with the application of heat. Etching is with $POCl_3$ gas at 900° to 1100° C. with an $SiO_2$ mask. It is desirable to align the crystal structure of the substrates such that the resulting crystal structure is substantially continuous after bonding. Further, the fusion bond should be made at a temperature as close as possible to the melting point. For this reason, the electrode material should be capable of withstanding the high fusion bond temperatures. For example, chrome, tungsten, tantalum, platinum and iridium allow bond temperatures in the 1300° C. to 1700° C. range so that bond strength is maximized and healing of discontinuities in the crystal can occur. A typical bonding time is one hour. Other conductors include metal silicides such as molybdenum silicide.

In a differential pressure transmitter, a temperature difference between the two sensors will cause an error. Acceptable performance will require that the difference be less than about 1° F. and that the difference be measured to a precision of better than about 0.1° F. and compensated. In a typical application, this will require that the sensor spacing be less than 0.5 inches.

A temperature gradient within a sensing element will also cause an error. Acceptable performance will require that the temperature difference between the inside and outside of the sensor be less than about 0.001° F. and that the sensors be closely matched. A sensor width or thickness of greater than about 0.25 inches will place unreasonable demands on sensor matching in a typical application.

Figure 11:
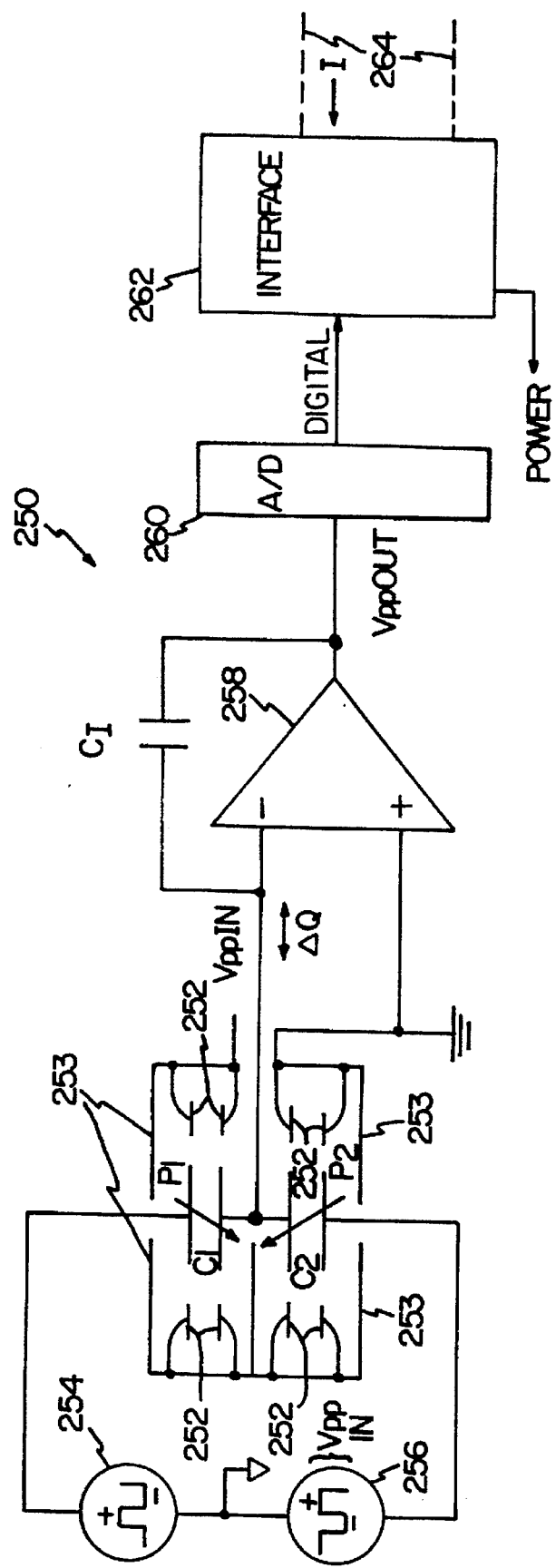
FIG. 11 is a schematic diagram of circuitry for measuring capacitance of a pressure sensor.

FIG. 11 is a simplified schematic diagram of circuitry 250 for sensing differential pressure using two absolute pressure sensors having pressure responsive capacitors $C_1$ and $C_2$ carried therein. Each pressure sensor includes guard electrodes 252 which form capacitors connected to earth ground 253 of transmitter 50. The housing of the transmitter thus provides a shield or guard to stabilize the capacitance signal and prevent electrical noise from being coupled into the circuit. In addition, a guard electrode can be formed on the exterior surface of the sensor or the interior surface of the ceramic inserts shown in FIG. 1. Electrical isolation can be provided to accommodate 4–20 mA circuits that have connections to earth ground in other places. Capacitor $C_1$ is driven by square wave generator 254 and capacitor $C_2$ is driven by square wave generator 256. The negative input of low noise differential amplifier 258 is connected to the undriven plates of capacitors $C_1$ and $C_2$, and the positive input of differential amplifier 258 is connected to electrical ground. Differential amplifier 258 has negative feedback through capacitor $C_f$ and has charge $\Delta Q$ from capacitor $C_1$ and $C_2$ flowing in and out of the negative input. The output of differential amplifier 258 is a square wave representative of differential capacitance which is converted into a digital format by A/D converter 260. In circuit 250, $\Delta Q$ is given as:

$$\Delta Q = V_{PPIN}(C_1 - C_2) \quad \text{Equation 2}$$

And, the amplifier output is:

$$V_{PPOUT} = \Delta Q / C_f \quad \text{Equation 3}$$
$$= V_{PPIN}(C_1 - C_2 / C_f)$$

$C_f$ should be selected to be approximately equal to $(C_1-C_2)/2$ at maximum differential pressure, for example, 1 pF. Additionally, to compensate for manufacturing variations, it is desirable to have separate gain adjustments for each sensor. Additionally, circuitry should be included to measure $C_1$, $C_2$ or $C_1+C_2$, independently, in order to compensate for variations in output due to common mode or line pressure. Circuitry for detecting capacitance output is set forth in U.S. Pat. No. 5,083,091, entitled "Charge Balanced Feedback Measurement Circuit," commonly assigned with the present application.

The output from converter 260 is provided to interface circuitry 262. Interface 262 is connected to a 4–20 mA current loop and provides the digital signal from A/D converter 260 to current loop 264 in either a digital or analog format. Interface 262 also provides power to circuitry 250 from loop 264. Interface 262 is also capable of receiving commands, such as those pursuant to the HART® communications standard.

Figure 12:
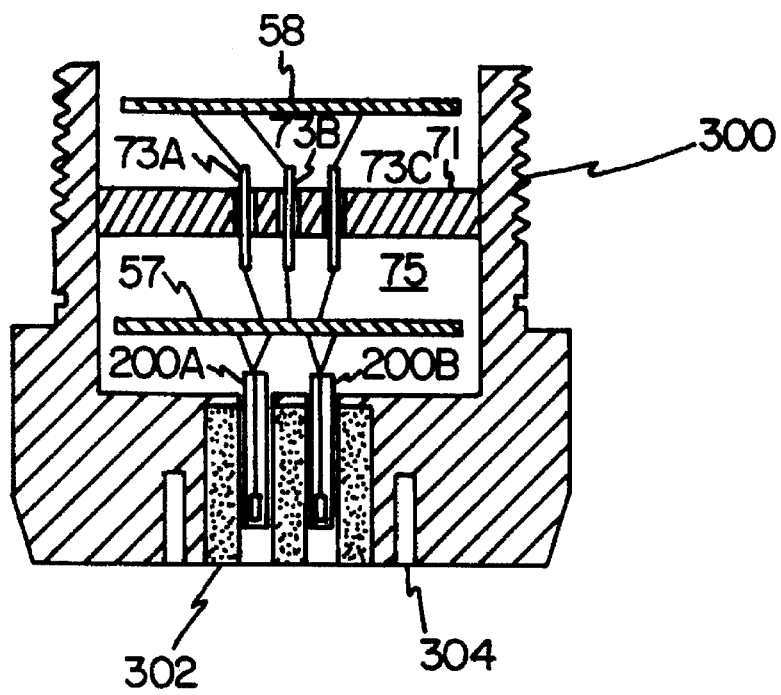
FIG. 12 is a cross-sectional view of a sensor body.
Figure 13:
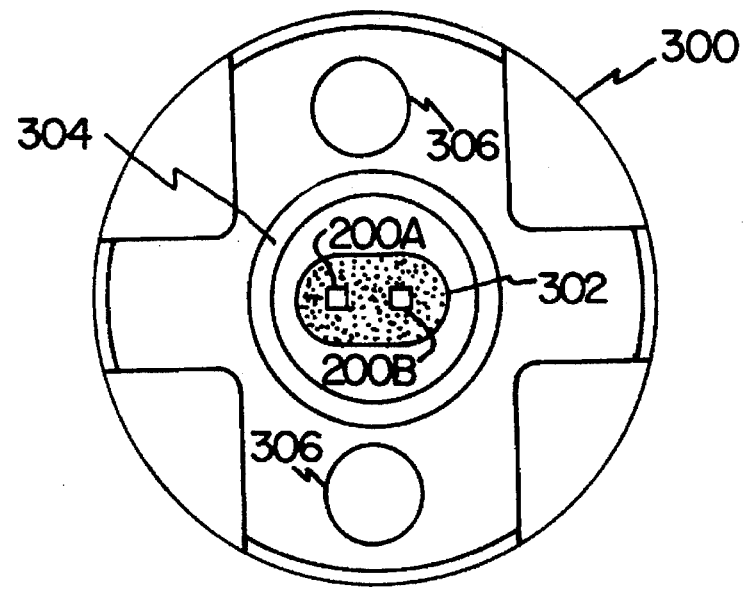
FIG. 13 is a bottom plan view of the sensor body of FIG. 12.

FIGS. 12 and 13 show another embodiment having sensor body 300 which carries pressure sensors 200A and 200B. FIG. 12 is a side cross-sectional view of sensor body 300 and FIG. 13 is a bottom plan view of body 300. Body 300 includes circuit boards 57 and 58 connected by wires through feed-throughs 73A, 73B and 73C through process barrier 71. Sensors 200A and 200B are carried in alumina insert 302. Process barrier 71 forms chamber 75 which may be a vacuum or filled with an inert gas. A groove 304 extends around alumina insert 302 and provides thermal and stress isolation. Mounting holes 306 are used to couple body 300 to a conduit (not shown). In another embodiment, a bond between the sensor and the transmitter body is a fusion bond.

Figure 14:
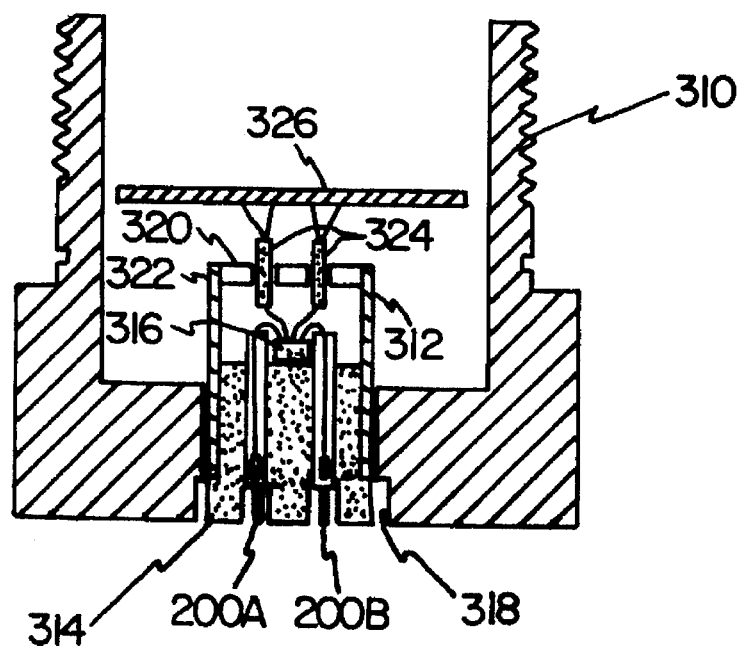
FIG. 14 is a cross-sectional view of a sensor body.
Figure 15:
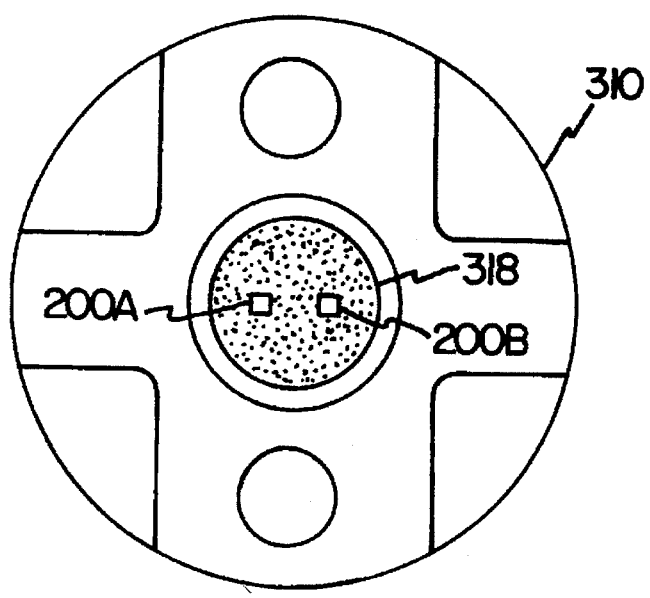
FIG. 15 is a bottom plan view of the sensor body of FIG. 14.

FIGS. 14 and 15 show sensor body 310 including middle shell 312 which carries alumina insert 314. Sensors 200A and 200B are seated in alumina insert 314 which also carries ASIC chip 316. ASIC chip 316 performs the same functions as circuit board 57. Groove 318 provides stress isolation for insert 314 and sensors 200A and 200B. Process barrier 320 seals shell 312 and provides a second barrier to process fluid. Cavity 322 in shell 312 may carry a vacuum or inert gas. Feed-throughs 324 provide a path for electric connections from ASIC chip 316 to circuit board 326. The design shown in FIG. 3 allows the sensor assembly to be tested prior to welding shell 312 into sensor body 310. High temperature operations (such as brazing the sensor to the alumina insert) can be conducted before mounting the sensor assembly in the housing.

In one embodiment, a pressure sensor of the invention has dimensions as follows:

TABLE 1

| Dimension | Size (Range) | Preferred |
|---|---|---|
| T | 0.02 to 0.2 inches | 0.05 inch |
| L | 0.15 to 1.5 inches | 0.6 inch |
| W | 0.02 to 0.2 inches | 0.1 inch |
| w | 0.01 to 0.1 inches | 0.05 inch |
| Cavity Thickness t | $5 \times 10^{-6}$ to $1 \times 10^{-4}$ inches | 0.000020 inch |
| y (gap deflection) at 4500 psi | $2 \times 10^{-6}$ to $5 \times 10^{-5}$ inches | 0.000012 inch |

A typical capacitance for the sensor is 42 pF at zero psi. In one embodiment, parameters of a pressure sensor are as follows:

TABLE 2

| PROPERTY | ZERO (0 psi) | FULL SCALE (4500 psi) | SPAN (4500 psi) |
|---|---|---|---|
| Gap (At Center) (µ Inches) | 20 | 11.25 | 8.75 |
| Gap (Effective Average) (µ Inches) | 20 | 12.37 | 7.63 |
| Sensor Capacitance (No Parasitics) (pf) | 42.2 | 68.2 | 26.0 |
| Parasitic Capacitor (w/o Guard Shield and assumes 0.6 inch length) (pf) | 1.97 | 1.994 | 0.024 |
| Sensor | −0.059 | 0.534 | 0.593 |

TABLE 2-continued

| PROPERTY | ZERO (0 psi) | FULL SCALE (4500 psi) | SPAN (4500 psi) |
| --- | --- | --- | --- |
| Temperature Coefficient (PSI/C) [ppm/C] | −13.1 | 118.6 | 131.7 |

Figure 16B:
FIGS. 16A through 16G show cross-sectional views of various embodiments of the invention.
Figure 16C:
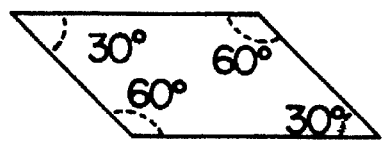
Figure 16A:
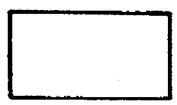
Figure 16D:
Figure 16E:
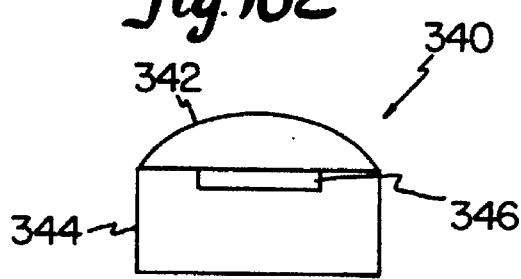
Figure 16F:
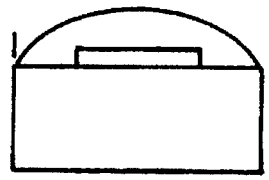
Figure 16G:
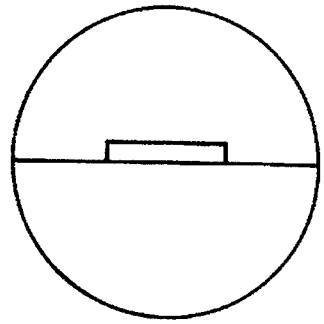

FIGS. 16A through 16G show cross-sections of a pressure sensor in accordance with one aspect of the invention. FIG. 16A shows a rectangular structure in which all interior angles are 90°. FIG. 16B shows a hexagonal sensor structure in which all interior angles are 60°. A rhombus structure is shown in FIG. 16C in which two inner angles are 60° and two angles are 30°. FIG. 16D shows a triangular structure in which all interior angles are 60°. The structures shown in FIGS. 16A through 16D are convenient structures for sapphire because they tend to lie along planes of a sapphire crystal. FIG. 16E shows a sensor 340 in which a rounded portion 342 is coupled to a rectangular portion 344. Cavity 346 is formed in rectangular portion 344. FIG. 16F shows another embodiment in which the cavity is formed in the rounded portion. Various alternatives are also available including rounding both portions, such as shown in FIG. 16G. A round cross section is desirable because it can be closely fit into a round hole and can be sealed with a round O-ring. It can be fabricated by machining a square structure with a diamond grinding wheel.

Figure 17A:
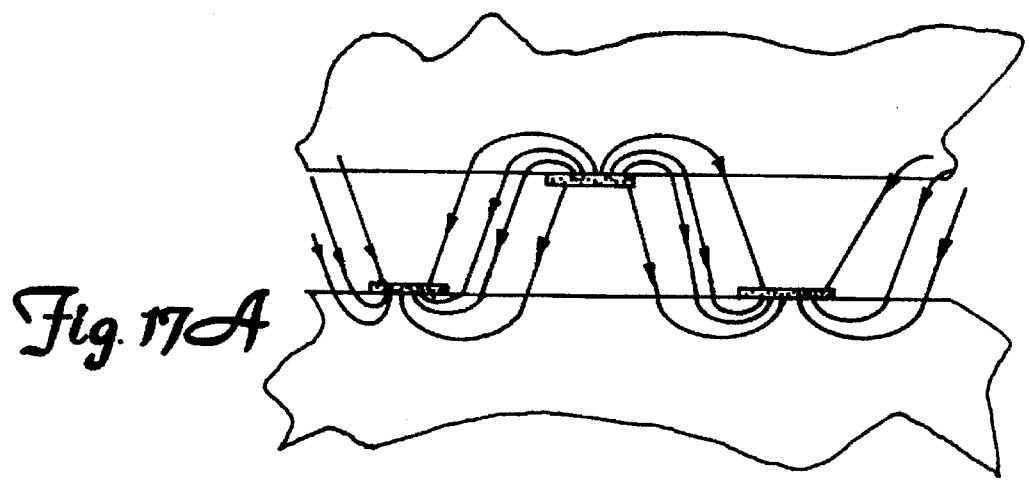
FIGS. 17A and 17B show two embodiments of capacitor plates.
Figure 17B:
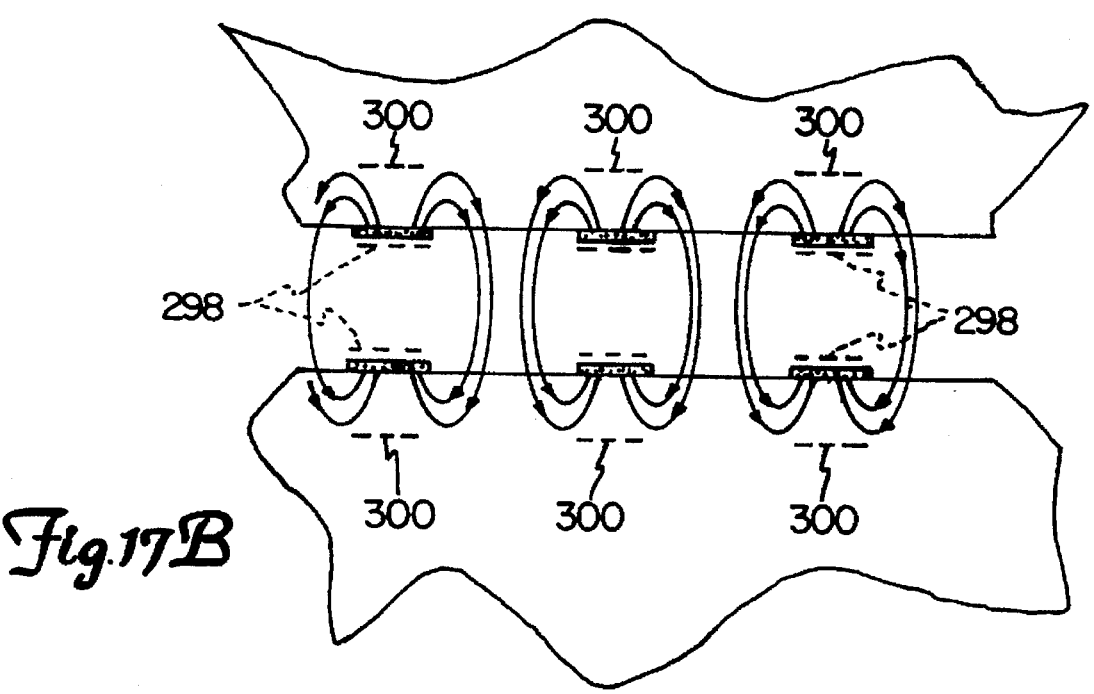

FIGS. 17A through 17B show example configurations of the electrodes for capacitive plates. Electrode instability causes errors in capacitive pressure sensors which have small gaps. Residual stress causes the pressure sensor structure to warp. Further, dimensional changes in the electrode surface change the gap dimension t. These changes can be caused by oxidation and reduction or migration of atoms on the opposing surfaces. FIGS. 17A and 17B show examples of a solution to this problem in which the capacitor plates are broken apart into strips having widths and spacings which result in a capacitance that is substantially equal to a solid electrode. For example, if the substrate has a dielectric constant of 10 times the gap dielectric constant, then the spacings could be about 10 times the gap dimension and the widths could be less than about the gap dimension. This reduces the amount of material available to warp the sensor structure. Further, the strips can be configured so that most of the electrical flux emerges from the back side of the electrodes. As the back side of the electrode is in contact with sapphire, it is protected from surface effects and will provide a stable capacitance even if the inside surface changes dimensions. FIGS. 17A and 17B show two example configurations which increase the amount of flux emanating from the back side of the electrodes. Variations on this embodiment include providing guard electrodes (298) which overlie each plate electrode and shield each plate electrode. Although these plates are spaced apart, they are similar to a continuous capacitor plate because of their spacing and relative size.

In one embodiment, the capacitor electrodes are implanted into the surface of the substrate. This provides electrode stability by protecting the electrode and helping to reduce the amount of the change in the capacitance over time. A sapphire substrate is implanted with V ions at a dose of $1 \times 10^{18}$ ions/cm$^2$ and an energy level of 200 KeV. This changes the resistivity of the sapphire from very highly resistant to about 15 Ohms/sq. The implanting process concentrates most of the V approximately 1000 Å beneath the original sapphire surface. An example of an implanted electrode 300 is shown in phantom in FIG. 17B.

Figure 18:
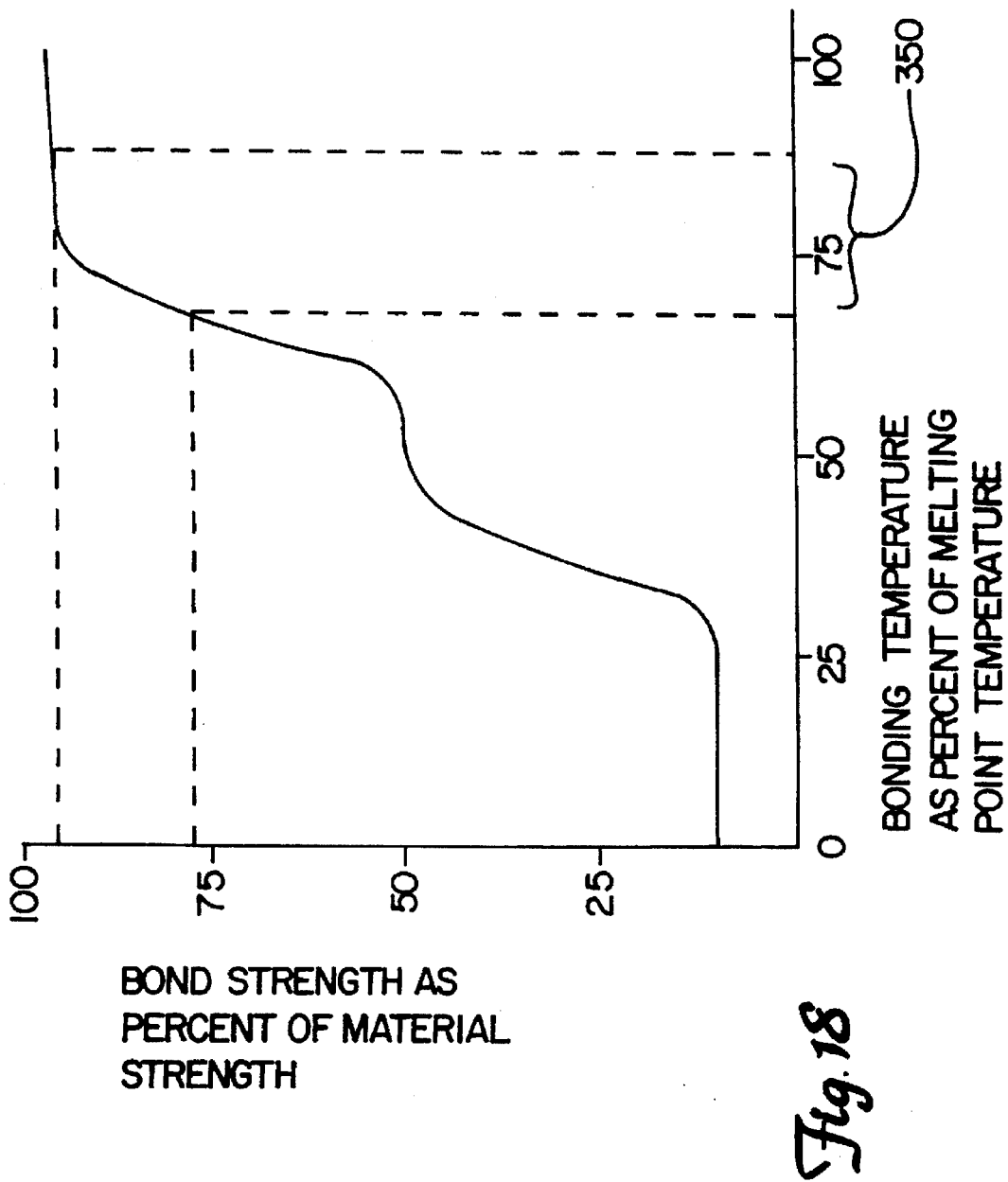
FIG. 18 is a graph of bonding temperature as a percent of melting point temperature versus bonding strength as a percent of material strength.

FIG. 18 is a graph of bonding temperature as a percent of melting point temperature versus bond strength as a percent of material strength. For maximum stability and accuracy, it is desirable to have the bond strength as close as possible to the material strength so that the sensor structure behaves as a unitary body. In one embodiment of the invention, bonding temperature is the range indicated at 350 in FIG. 18. Sapphire, quartz or silicon can be used in forming a pressure sensor, and their melting points are 2050° C., 1723° C. and 1415° C., respectively. The desired range 350 shown in FIG. 18 is from a temperature of about 68% of the melting point absolute temperature. In one embodiment, bonding temperature should not exceed about 95% of the melting point temperature. The desired fusion bond as used herein is a bond having a strength which is substantially the same as the strength of the underlying crystal material, and is formed by the application of heat with substantially no foreign material in the bond.

Although the present invention has been described with reference to preferred embodiments, workers skilled in the art will recognize that changes may be made in form and detail without departing from the spirit and scope of the invention. Single crystal materials include sapphire, silicon, quartz, ruby and diamond. Generally, these are materials with low hysteresis which are highly stable thereby providing little creep. In general, materials with higher melting points will be more stable thus, sapphire is one preferred material. The cavity of the sensor can be a vacuum or filled with a fluid or gas. The electrodes can include conductors such as metals, metal oxides or doped semiconductors and can be protected with an insulating dielectric material such as quartz. In another embodiment, the stress isolation structure is formed of a polycrystalline material. Further, the bonding can be formed with or without the use of pressure.

What is claimed is:

1. A pressure sensor in a pressure transmitter, comprising:
   a pressure responsive structure;
   a first capacitor plate having a back side attached to the pressure responsive structure and a front side;
   a second capacitor plate having a back side attached to the pressure responsive structure and a front side, the first and second capacitor plates positioned to provide relative deflection therebetween in response to pressure applied to the pressure responsive structure; and
   wherein the electric field between the first and second capacitor plates emanates substantially between the back sides of the first and second capacitor plates.

2. The pressure sensor of claim 1 wherein the pressure responsive structure includes a cavity and the capacitor plates are positioned on opposite sides of the cavity.

3. The pressure sensor of claim 2 including a plurality of first capacitor plates on a first side of the cavity adjacent the first capacitor plate and a plurality of second capacitor plates on a second side of the cavity adjacent the second capacitor plate.

4. The pressure sensor of claim 3 wherein the first capacitor plates are laterally offset relative to the second capacitor plates.

5. The pressure sensor of claim 1 wherein the pressure responsive structure comprises sapphire.

6. The pressure sensor of claim 1 wherein the pressure responsive structure comprises first and second portions fusion bonded together and forming a gap therebetween which carries the first and second capacitor plates.

7. The pressure sensor of claim 1 wherein the pressure responsive structure has a length between a mounting portion and a sensing portion selected to provide a desired stress isolation.

\* \* \* \* \*

UNITED STATES PATENT AND TRADEMARK OFFICE
CERTIFICATE OF CORRECTION

PATENT NO. : 5,637,802
DATED : June 10, 1997
INVENTOR(S) : Roger L. Frick et al.

It is certified that error appears in the above-indentified patent and that said Letters Patent is hereby corrected as shown below:

Under [54] change "TRANSMITTED" TO --TRANSMITTER--

Under [56] References Cited

U.S. PATENT DOCUMENTS

Please add --5,424,650 6/1995 Frick . . . . . 324/688--.

Col. 4, lines 38-40, please change $$\left(y\alpha\frac{w^2}{T^2}\right)$$

to $$--\left(y\alpha\frac{w^3}{T^2}\right)--$$

UNITED STATES PATENT AND TRADEMARK OFFICE
CERTIFICATE OF CORRECTION

PATENT NO. : 5,637,802
DATED : June 10, 1997
INVENTOR(S) : Roger L. Frick et al.

It is certified that error appears in the above-indentified patent and that said Letters Patent is hereby corrected as shown below:

Col. 7, line 50, please change $-V_{PPIN}(C_1-C_2/C_1)$ to -- $-V_{PPIN}(C_1-C_2/C_I)$ --

Signed and Sealed this

Second Day of June, 1998

Attest:

BRUCE LEHMAN

Attesting Officer    Commissioner of Patents and Trademarks